US012591051B2

(12) United States Patent
Reimann

(10) Patent No.: US 12,591,051 B2
(45) Date of Patent: Mar. 31, 2026

(54) METHOD FOR DETERMINING A DISTANCE BETWEEN TWO OBJECTS WITH THE INVOLVEMENT OF A THIRD OBJECT

(71) Applicant: Lambda:4 Entwicklungen GmbH, Hamburg (DE)

(72) Inventor: Rönne Reimann, Hamburg (DE)

(73) Assignee: Lambda:4 Entwicklungen GmbH, Hamburg (DE)

( * ) Notice: Subject to any disclaimer, the term of this patent is extended or adjusted under 35 U.S.C. 154(b) by 407 days.

(21) Appl. No.: 18/250,885

(22) PCT Filed: Nov. 3, 2021

(86) PCT No.: PCT/EP2021/080523
§ 371 (c)(1),
(2) Date: Apr. 27, 2023

(87) PCT Pub. No.: WO2022/096513
PCT Pub. Date: May 12, 2022

(65) Prior Publication Data
US 2023/0384410 A1 Nov. 30, 2023

(30) Foreign Application Priority Data

Nov. 4, 2020 (WO) ................. PCT/EP2020/081014
Nov. 4, 2020 (WO) ................. PCT/EP2020/081015

(51) Int. Cl.
*G01S 11/08* (2006.01)
*G01S 5/02* (2010.01)

(52) U.S. Cl.
CPC ............. *G01S 11/08* (2013.01); *G01S 5/0289* (2013.01)

(58) Field of Classification Search
CPC ........ G01S 11/02–10; G01S 5/10; G01S 5/14; G01S 5/02213; G01S 5/0284; G01S 5/02216; B60R 25/245; H04W 64/00
See application file for complete search history.

(56) References Cited

U.S. PATENT DOCUMENTS

| 6,489,923 | B1 | 12/2002 | Bevan | |
| 10,328,899 | B2 * | 6/2019 | Golsch | ................. G01S 13/765 |

(Continued)

FOREIGN PATENT DOCUMENTS

| DE | 112014004426 | 6/2016 |
| EP | 0664625 | 7/1995 |

(Continued)

OTHER PUBLICATIONS

E. Lance and G. K. Kaleh, "A diversity scheme for a phase-coherent frequency-hopping spread-spectrum system," in IEEE Transactions on Communications, vol. 45, No. 9, pp. 1123-1129, Sep. 1997, doi: 10.1109/26.623078 (Year: 1997).*

(Continued)

*Primary Examiner* — Cassi J Galt
(74) *Attorney, Agent, or Firm* — Sand, Sebolt & Wernow Co., LPA

(57) ABSTRACT

A method for determining a distance between two objects with the involvement of a third object. The first object can be an authorization means, such as a key fob or a mobile telephone. In the method, a first object transmits one or more first-object signals with different first-object frequencies and at least one third object transmits at least one third-object signal. A second object receives the first-object signal and the third-object signal, and on the basis thereof the distance between the first object and the second object is determined. The second object and the third object are clock- and/or time-synchronized. The method includes the feature that the third object and/or the first object switches between at least (Continued)

two frequencies such that phase coherence is maintained or such that the phase jump is known.

17 Claims, 1 Drawing Sheet

(56) References Cited

U.S. PATENT DOCUMENTS

| | | | |
|---|---|---|---|
| 2002/0008615 A1 | 1/2002 | Heide et al. | |
| 2007/0176749 A1* | 8/2007 | Boyd | H04W 64/00 |
| | | | 340/13.24 |
| 2009/0303067 A1* | 12/2009 | Sharp | G01S 11/08 |
| | | | 340/686.1 |
| 2012/0019413 A1 | 1/2012 | Fretenburg | |
| 2017/0269189 A1* | 9/2017 | Swindell | G01S 5/0036 |
| 2020/0099561 A1 | 3/2020 | Lee et al. | |
| 2020/0118372 A1 | 4/2020 | Stitt et al. | |

FOREIGN PATENT DOCUMENTS

| | | |
|---|---|---|
| EP | 1650581 | 4/2006 |
| EP | 2212705 | 8/2010 |
| EP | 2525238 | 11/2012 |
| EP | 2710398 | 3/2014 |
| EP | 3502736 | 6/2019 |
| EP | 3564703 | 11/2019 |
| EP | 3564706 | 11/2019 |
| EP | 3564707 | 11/2019 |
| WO | 2009067997 | 6/2009 |
| WO | 2010025273 | 3/2010 |
| WO | 2012155993 | 11/2012 |
| WO | 2014130196 | 8/2014 |
| WO | 2019238789 | 12/2019 |
| WO | 2020060686 | 3/2020 |
| WO | 2020156939 | 8/2020 |
| WO | 2020165134 | 8/2020 |
| WO | 2022016161 | 1/2022 |
| WO | 2022096091 | 5/2022 |
| WO | 2022096509 | 5/2022 |
| WO | 2022096510 | 5/2022 |
| WO | 2022096511 | 5/2022 |
| WO | 2022096512 | 5/2022 |
| WO | 2022096514 | 5/2022 |
| WO | 2022096515 | 5/2022 |

OTHER PUBLICATIONS

Synchronization in Wireless Sensor Networks using Bluetooth, Casas et al., Third International Workshop on Intelligent Solutions in Embedded Systems, 2005., ISBN: 3-90246303-1, May 1, 2005.

* cited by examiner

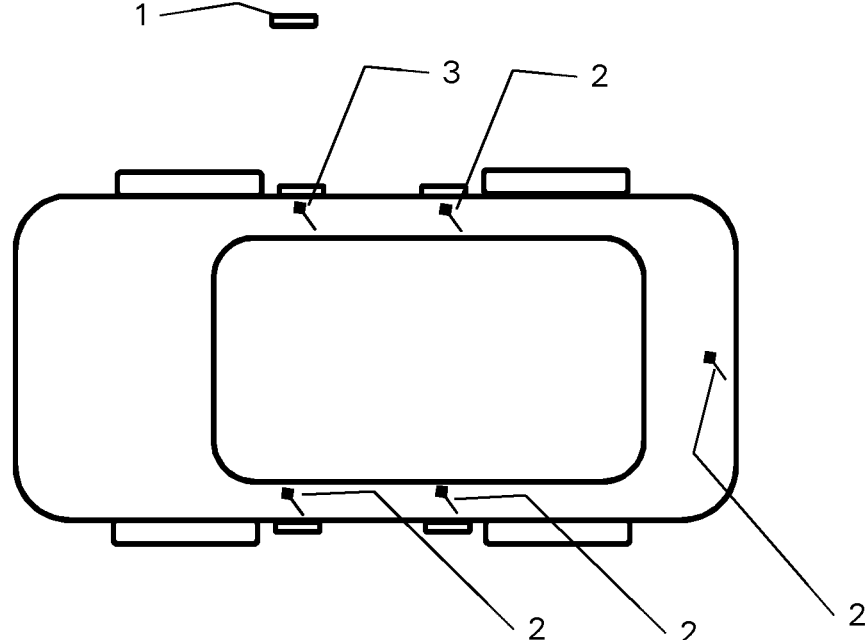

METHOD FOR DETERMINING A DISTANCE BETWEEN TWO OBJECTS WITH THE INVOLVEMENT OF A THIRD OBJECT

TECHNICAL FIELD

The invention relates to a method for determining a distance between two objects with the involvement of a third object.

BACKGROUND ART

Passively determining the location in an anchor network by overhearing the communication of the anchors is known from EP 2710398 B1, in which a plurality of distances is determined, and the location or the distance to one or more anchors is determined therefrom.

From US 2020/118372 A1, determining the distance to a key is known, using a passive sniffer in a motor vehicle, after communication has been initiated by an active node of the motor vehicle. From a plurality of available antennas, the most suitable are determined on the basis of RSSI values. Antennas with different polarities are used and round-trip times, or phase shifts per frequency at which a round-trip was traveled, are measured, or differences between them are determined. For this purpose, the change in phase over a round-trip at a first frequency is compared to the change in phase for a second round-trip with a second frequency, and the change from the first frequency to the second frequency is considered. Phase-coherent switching between the frequencies is not carried out. Moreover, the phase difference of the switching is not known.

SUMMARY OF THE INVENTION

The problem which the present invention seeks to solve is to determine a distance between at least two, particularly three, objects, wherein a first of the objects emits a plurality of signals with different frequencies, particularly successively, particularly a frequency hopping, wherein at least one third object also emits signals, particularly carries out a frequency hopping, and the second of the objects receives the signals of the first object and of the at least one third object, and from this the distance between the first and the second objects is determined, without an indirect determination being necessary, particularly by way of the distance between the first and the third object, wherein particularly the second and third object are time-synchronized, and/or are arranged in a fixed relative spatial orientation, in particular.

The first object can be, in particular, an authorization means, such as a key fob or mobile phone. The second and third object are, in particular, part of an arrangement to which access is sought and/or granted by means of the authorization means. For example, this arrangement can be a building, a motor vehicle or a barrier, an automated machine or computer.

This is solved, inter alia, by a method for determining a distance, particularly directly, between two objects, wherein a first of the objects transmits at least one first-object signal, particularly a plurality of first-object signals, with different first-object frequencies, and wherein the at least one second object receives the first-object signals of the first object, and on the basis thereof, the distance between the first and the at least one second object is determined, wherein the at least one second and at least one third object are clock-cycle- and/or time-synchronized, wherein the at least one second object does not transmit any signals except for time synchronization, and/or the at least one second object does not transmit any signals used for distance determination, and/or is passive other than the time synchronization, wherein particularly the at least one second object does not transmit any radio signals, characterized in that the at least one third object transmits at least one third-object signal. This third-object signal can be used and/or suitable for determining distance, for example, on the basis of phase measurement (phase-based ranging, PBR) and/or time-of-flight measurements (pulse time-of-flight, ToF), and/or be used alone, however, for coordinating the timing or for conveying information for executing the method, for example, about initializing it. In any case, some kind of radio communication takes place between the first and at least one third object.

Particularly preferably, a time synchronization is calculated and/or improved between the first and second, and/or between the second and at least one third, and/or the first and at least one third, object, on the basis of the at least one first and/or third signal.

Advantageously, first-object signals and/or third-object signals are, or contain, at least one frequency hopping. This augments the accuracy of the method.

In particular, a frequency hopping is understood as transmitting successively on different frequencies. A frequency hopping is to be carried out on both sides when two objects carry out, particularly successively, a frequency hopping.

The frequencies, particularly those of the frequency hopping, lie particularly in a span from 25 to 100 MHz, in particular they completely span such a span. The frequencies, particularly those of the frequency hopping, lie particularly in the range from 2 to 6 GHZ. A spacing in the range from 0.1 to 17 MHz, particularly in the range from 0.5 to 10 MHz, lies particularly between adjacent but not necessarily consecutive frequencies, particularly of the frequency hopping.

In a first embodiment, the third object can switch phase-coherently between at least two third-object frequencies, and/or switch such that the phase difference at the first and/or second object is known, and/or the phase difference is made known to the first and/or second object.

In a second embodiment, which also can be combined with the first, the first object can change phase-coherently between at least two of the first-object frequencies of the at least one first-object signal, and/or change such that the phase difference at the second and/or third object is known, and/or the phase difference is made known to the second and/or third object.

The phase difference or phase jump at the change between frequencies can be known, for example, in that it is predetermined or can be derived from other known values, for example, the duration of a, particularly directly, preceding, emission at a frequency.

The phase difference when switching between two frequencies generally arises due to technical reasons, but can also be prevented. The switching between two frequencies can be carried out with a short interruption or interruption-free. At the time of the interruption-free change, the phase jumps, or during the change with interruption, the phase of the signals theoretically imagined to continue during the interruption, jumps before and after switching. A defined phase jump exists at the change time-point without interruption, or at a theoretical change time-point during the interruption, particularly in the middle of the interruption and/or at the end of the signal before the interruption or at the beginning of the signal after the interruption. This is the phase difference.

Preferably, the at least one third object changes between the at least two third-object frequencies, particularly for receiving the first-object signals, wherein these third-object frequencies are then, in particular, identical or at least similar to the respective first-object frequencies, and/or for transmitting at least one, particularly a plurality, of own third-object signals.

Particularly advantageously, the at least one second object receives the first-object signals and third-object signals of the first and of the at least one third object, and from them or on the basis thereof, the distance between the first and the at least one second object is determined.

Preferably, at least one distance each between the first and each second object is determined.

In particular, signals transmitted by the second object are not used for determining a distance, and/or the method is conducted such that they do not play a relevant role therein, and/or they do not, or only insubstantially, improve the accuracy, particularly by less than 10% of the accuracy, particularly less than 2% of the accuracy, i.e., at an accuracy of 1 m/100 m, for example, by less than 10 cm/100 m, particularly by less than 2 cm/100, i.e., not to an accuracy better than 90 cm/100 m or not to an accuracy better than 98 cm/100 m. In particular, the signals transmitted by the second object are used exclusively for time synchronization. Although a time synchronization or the synchronousness of the clocks is strongly preferred, this can be achieved by other means than by signals of the objects. To the extent that this is also brought about by signals of the second object, these signals are used indirectly for distance determination, by using the knowledge of the times in the objects or their drift or their synchronousness, but preferably not the signals themselves, particularly not their times-of-flight and not their phase situations, even when these may have been used for the time synchronization.

Thus, when one imagines the method sequence such that the time synchronization was achieved, inter alia, with a first quantity of signals of the second object, and a second quantity of signals of the first and of at least one third object was transmitted, the method is conducted particularly such that the accuracy of the distance determination using signals of the first quantity, of the second quantity, and of the synchronized clocks, is not better than the accuracy of the distance determination obtained solely on the basis of the second quantity and the synchronized clocks, by more than 10%, particularly not more than 2%, of the accuracy of the distance determination solely on the basis of the second quantity of the synchronized clocks.

Advantageously, the at least one third-object signal has different third-object frequencies, and/or switches between them.

The signals, particularly first-object and third-object signals, are radio signals, in particular.

In particular, the distance is determined based on frequencies and phases (phase-based ranging), particularly also amplitudes, of the first-object and third-object signals received at the at least one second object, and on the time differences between the first and third, and between the third and second, object, and particularly also on information about the emitted first-object and/or third-object signals, such as points in time at which certain features were emitted, for example features such as, frequency change and/or their points in time in the first-object and/or third-object signals.

Above and beyond this, optionally information supplied by at least one third object, particularly phase correction information about the at least one received first-object signal, and/or information supplied by the first object, particularly phase correction information, about the at least one third-object signal, can be used.

In particular, the at least one first-object signal and/or the at least one third-object signal has at least one feature per frequency and/or per signal.

Features of the signal are to be understood particularly as changes of the signal, such as change in amplitude, polarization, the emitting antenna (change between antennas), frequency and/or phase, thus such a feature can be, for example, the beginning or end of the emission of a frequency. However, aggregated groups of features can also be used, which augment the robustness of the method in some situations. For example, modulated packets or synchronization characters can be used as groups of features.

The problem is also solved by a system having at least a first, a second, particularly a plurality greater than 1, particularly greater than two, of second objects, and at least one third object, wherein the first object is configured for emitting first-object signals of different frequency, and preferably the at least one third object is configured for emitting third-object signals of different frequency, and all objects are configured for receiving signals, wherein the at least one second and the third object are configured for carrying out a clock-cycle- and/or time-synchronization, and wherein the system has at least one controller that is configured for carrying out the method according to the invention, characterized in that the third object is configured for switching phase-coherently between at least two third-object frequencies, and/or for switching such that the phase difference at the first and/or second object is known, and/or the phase difference is made known to the first and/or second object, and/or that the first object is configured for switching phase-coherently between at least two of the first-object frequencies of the at least one first-object signal, and/or switching such that the phase difference at the second and/or third object is known, and/or the phase difference is made known to the second and/or third object.

The system is also achieved by an access system having at least one access restriction apparatus, wherein the access restriction apparatus is configured for granting and/or denying access, particularly by means of an access restriction means, further having at least one first, one second, particularly a plurality greater than one, particularly greater than two, of second objects, and at least one third object, wherein the first object is configured for emitting first-object signals of different frequency, and particularly the third object is configured for emitting third-object signals of different frequency, and all objects are configured for receiving signals, wherein the at least one second and the third object are configured for carrying out a clock-cycle- and/or time-synchronization, and wherein the third object is configured for switching between two third-object frequencies, particularly of the third-object signals, and/or wherein the first object is configured for switching between at least two first-object-frequencies of the first-object signals, and wherein the system has at least one controller that is configured for carrying out the method according to the invention, thereby determining at least one distance between at least one second object and the first object, wherein the access restriction apparatus is configured for not denying the access and/or granting the access if the at least one certain distance between the at least one second object and the first object does not exceed a predetermined distance and/or lies within a predetermined distance range, and/or the certain position of the first object within a first and/or outside of a second predetermined range, and/or for denying the access and/or not granting the access when the at least one, particularly all, certain distance(s) between the at least one second object and the first object exceed(s) the predetermined distance and/or lie(s) outside the predetermined distance range, and/or the certain position of the first object lies outside of a first and/or inside of a second predetermined range, characterized in that the third object is configured for switching phase-coherently between at least two third-object frequencies, and/or for switching such that the phase difference at the first and/or second object is known, and/or the phase difference is made known to the first and/or second object, and/or that the first object is configured for switching phase-coherently between at least two of the first-object frequencies of the at least one first-object signal, and/or switching such that the phase difference at the second and/or third object is known, and/or the phase difference is made known to the second and/or third object.

Phase-coherent switching or changing between two frequencies is understood to mean, particularly, that the phase after the switching is known relative to the phase situation before the switching. This is the case when the change of phase when switching is zero or is a previously known value. If switching is done such that the phase difference is known, the difference in the phase situation before and after the switching is known. The value can also be previously known in that it can be derived from previously known values, for example, from the duration of the, particularly directly, preceding emission at a frequency.

For example, this is the case when a defined phase situation is always set for switching, and the duration of the emissions since the last switching is measured or known.

Thus, especially advantageously, the knowledge of the phase jump upon the change in frequency is used to enable a simple measurement or calculation, for example, for correcting the measurement of the change in phase shift. At a phase jump of zero, this knowledge is also used, in particular, in that the measurement of the change in phase shift is used directly to calculate a distance, i.e., it is corrected only by zero.

Directly ascertaining the distance significantly improves the accuracy and/or speed, compared to the method from EP 2710398 B1.

Synchronizing timers in two objects is known, both via cabled and wireless connections. For example, there is the NTP protocol. Within the scope of a Bluetooth connection, too, a synchronization is provided in which each object has a freely running 28-bit clock with a cycle of 3.2 kHz and each object ascertains its offset relative to a central clock, and corrects the offset on a regular basis. In this case, synchronization with an accuracy of approximately 125 ns is achieved. Improved time synchronization is also known, for example, from DE1 1 201 4004426T5 or "Synchronization in radio Sensor Networks Using Bluetooth," Casas et al., Third International Workshop on Intelligent Solutions in Embedded Systems, 2005, ISBN: 3-90246303-1. This can be used for saving energy, for example, in that an object is kept ready to receive only in certain time slices, which are known to the other object, in order to send at corresponding times. Synchronization of the clocks is also still possible, at least with one-sided relatively strong interference on the radio channel, although known distance measurements become impossible or very inaccurate, or take a very long time during such interference. However, synchronization to a cycle of a received signal at the receiver of the signal must be clearly differentiated from the accuracy of a time synchronization. In this case, there is no synchronization of two clocks at two objects, but rather the receiving object is set such that it is synchronized with the incoming signal. The signal time-of-flight does not play a role here, since for that it is irrelevant when the signal was sent and/or how long it took to be transmitted.

Especially advantageously, the at least one second object and the third object are or will be time- and/or clock-cycle-synchronized to 10 ns or better, particularly in the range between 10 ns and 100 ps. This augments the accuracy of the method.

Especially advantageously, the at least one second object and the first object, and/or the first object and the at least one third object, are or will be time- and/or clock-cycle-synchronized, particularly to 10 ns or better, particularly in the range between 10 ns and 100 ps, time- and/or clock-cycle-synchronized. This augments the accuracy of the method.

The difference in drift between the timers of the first object and at least one second object, or of the at least one second object and at least one third object, can also be determined and used for correction. Numerous methods for this purpose are known from the prior art.

Advantageously, for each first-object and third-object signal received at a second object, a value proportional to its amplitude, and a phase value, are determined, and particularly therefrom, in each case a complex number is determined which is used for determining the distance between the first and the second object. In particular, a matrix, particularly an autocorrelation matrix, is constructed from a plurality of the complex numbers of the first-object and/or third-object signals, and the distance is determined by means of this and, for example, MUSIC, CAPON, comparison with, distance calculation to, and/or projection onto, the emitting and/or receiving characteristics. In particular, at least one complex matrix, particularly an autocorrelation matrix, is constructed of first-object signals received at a second object, and/or at least one matrix, particularly an autocorrelation matrix, is constructed of third-object signals received at a second object. Advantageously, the distance calculation occurs by means of eigenvalue, or eigenvector, determination of the at least one autocorrelation matrix and/or Fourier transformation of the complex values.

The phase value is alternatively determined particularly in that with regard to a plurality of pairs of the signals with adjacent frequency, in each case a change in the phase shift scaled to a frequency spacing is calculated, i.e., the derivation of the phase shift is calculated on one of the frequencies, or the frequencies, of the pair, and the values obtained therefrom are used for determining the phase of the complex number at the respective frequency (which belongs to the value that is proportional to the amplitude), particularly by approximate integration via the frequency. When f=0 Hz, it is not necessary to begin with the integration, but rather it is possible and preferred for an offset common to all complex numbers to be used, particularly the lowest frequency of the, particularly the selected, signals. The phase value is determined particularly from the signal time-of-flight or signal round-trip time.

In particular, the scaled phase shift change (dPhase shift (f1, f2)) is obtained by using the formula:

$$\text{dPhase shift}(f1,f2)=a^*(RTT(f3))^*\text{dFrequency}(f1,f2) \text{ or}$$

$$\text{dPhase shift}(f1,f2)=b^*(STT(f3))^*\text{dFrequency}(f1,f2)$$

where dFrequency (f1,f2) is the difference between the frequencies f1 and f2, RTT (f3) is double the signal time-of-flight or is the signal round-trip time (pulse time-of-flight, ToF) between the first and second object, or STT is the one-way signal time-of-flight (pulse time-of-flight, ToF) at one or more frequencies f3, similar to f1 and/or f2, and/or vice versa, and wherein a or b is a constant, in particular, a equals Pi and b equals two-Pi.

The phase shift is a phase shift upon transmission at the frequency from one object to the other, and back, which occurs as a result of the distance. It can be approximately equated with double the phase shift that occurs upon transmission at the frequency from one object to the other as a result of the distance.

Frequencies are regarded as similar particularly when they differ from one another by less than 17 MHz, particularly less than 10 MHz, particularly less than 2 MHz, and/or less than 5%, particularly less than 2%, of the lower frequency.

In particular, the complex value Z is calculated for a frequency, using:

$$\text{Amount}(Z(f)) = (b * \text{Amplitude}(f) + \text{offset})$$

$$\text{Argument}(Z(f)) = \text{Sum}(\text{dPhase shift}(f(n+1), fn)) \text{ using } fn \text{ from } f0 \text{ to } f(n+1) = f.$$

Thus the changes of the phase shift are summed, from the lowest frequency to the frequency in question, for which the complex number is to be determined. The lowest frequency is approximately equal for all complex numbers, in particular, it is identical. Moreover, the phase shift changes are, in particular, always to be summed for consecutive frequency pairs in which the higher frequency is approximately equal, in particular, is identical, to the lower of the frequencies of the next pair, thus in particular $$\text{dPhase shift}(f1, f0) + \text{dPhase shift}(f2, f1) + \text{dPhase shift}(f3, f2) + \ldots + \text{dPhase shift}(f, fn)$$

where $f = f(n+1)$

F0 is approximately equal, in particular is equal, for all complex numbers of a vector and/or of a matrix.

b and offset are constants and, in particular, b is equal to 1, and in particular, offset is equal to 0. Amplitude (f) is the received amplitude measured at frequency f, or a mean value from a plurality of amplitudes measured at frequency f and/or frequencies similar to f. Alternatively, the power can also be used.

In particular, a matrix, particularly an autocorrelation matrix, is constructed from a plurality of the complex numbers. This is done particularly by constructing a vector from the complex numbers, in which the complex numbers are written in the columns or rows of the vector, and its autocorrelation matrix is constructed. The distance is determined by means of this, for example, by means of known methods, for example MUSIC, CAPON, comparison with, distance calculation to, and/or projection onto, the emitting and/or receiving characteristics. Advantageously, the distance calculation occurs by means of eigenvalue, or eigenvector, determination of the at least one matrix and/or Fourier transformation of the complex values.

Such approaches are advantageous for achieving a reliable determination, particularly with multipath signal propagation.

In certain embodiments, it can be advantageous to arrange the at least one second object and the third object in a fixed relative spatial situation and orientation, for example, when the distance measurement is carried out for the purpose of access control. This facilitates the calculation and augments the reliability.

Advantageously, data is transmitted with the first-object and/or third-object signals, particularly payload data, particularly data such as are necessary for the method according to the invention.

Advantageously, the objects are parts of a data transmission system, particularly a Bluetooth, WLAN, or mobile radio, data transmission system. Preferably, the first-object and/or third-object signals are signals of the data transmission system, and/or of a data transmission standard, for example a mobile radio standard, WLAN, or Bluetooth, that is used for data transmission according to the data transmission standard.

Advantageously, the first-object and/or third-object signals are transmitted over multiple antenna paths, particularly with multiple antennas, particularly successively, transmitted at the transmitting object, and/or received at the receiving object, with multiple antennas.

Preferably, the first object is an authorization means, such as a key fob or mobile phone. Advantageously, the second and third object are part of an arrangement to which access is sought and/or granted by means of the authorization means, wherein the arrangement is particularly a building, a motor vehicle or a barrier, an automated machine and/or computer.

It is preferred that the third object receives the first-object signals and supplies information about the received first-object signals, and this is used in calculating the distance, and/or that the first object receives the third-object signals and supplies information about the received third-object signals, and this is used in calculating the distance. This is advantageous particularly when the time-point of the emission, and/or the phase position during the emission, otherwise would be/are not known in the system.

Especially advantageously, the at least one second object is passive, and/or the at least one second object does not itself transmit any signals or any signals used for distance calculation, and/or the at least one second object does not itself within the scope of the method transmit any signals or any signals used for distance calculation. By this, the method duration can be shortened and the securing can be concealed through the distance determination between the first object and at least one second object, and can be thereby implemented more securely.

Preferably, the method is implemented such that at least one of the transmitting objects (the first and/or at least one third object) switches between signals phase-coherently, particularly without phase jump or with known phase jump, and/or the phase jump is measured locally and considered and/or corrected in the distance determination, and/or at least one of the objects determines a phase correction information from signals of one of the other objects, which phase correction information is used in the distance calculation, in particular, wherein the first object switches phase-coherently between at least two of the first-object frequencies of the first-object signals, and/or the third object switches phase-coherently between at least two of the third-object frequencies of the third-object signals, and/or the third object ascertains at least one phase correction information from the first-object signals, and/or the first object ascertains at least one phase correction information from the third-object signals, and wherein the at least one phase correction information is used in the distance calculation. Such an embodiment, in which additional information about the phase situation at the transmitting object is available, allows the method to be implemented more accurately, more robustly, and the calculation to be simplified.

In particular, the first, second, and/or third object also switch phase-coherently for receiving. Alternatively, they measure the phase jump of the phase when the frequency changes, and this phase jump is corrected in the calculation.

Thus preferably, not only the transmitting object switches phase-coherently, but rather also the receiving object does so, particularly a PLL is switched phase-coherently in each object.

Especially preferably, the points in time, and/or the time schedule, of the emissions of the third-object signals and/or of the first-object signals, is predetermined, and/or this/they is/are considered in the distance calculation. In this manner, a more accurate determination and simpler calculation can be achieved.

In a preferred embodiment, the method contains the synchronization of the times and/or clock-cycles in at least one second and third object, particularly wireless or cabled. Preferably, a time- and/or clock-cycle-synchronization and/or -correction is carried out between the at least one second and third object before, after and/or while the method is carried out. However, the synchronization can also be given or accomplished by other methods. In particular, the differences in the times and/or clock-cycles between at least one second and third object are known and/or synchronous. This augments the accuracy of the method. Preferably, a drift of the clocks of the at least one second and/or third object, or a difference in the drift of the clocks of the at least one second and third object, is also determined and considered in the distance determination. This further augments the accuracy of the method. In a preferred embodiment, the method contains the synchronization, particularly wirelessly, of the times and/or clock-cycles between the second and first object. Preferably, a time- and/or clock-cycle synchronization and/or correction is carried out between the first and third object before, after and/or while the method is carried out. However, the synchronization can also be given or accomplished by other methods. In particular, the differences in the times and/or clock-cycles between the second and third object are known and/or synchronous, the comparison can also be done using cables. This augments the accuracy of the method. Preferably, a drift of the clocks of the first and/or third object, or a difference in the drift of the clocks of the second and third object, is also determined and considered in the distance determination. This further augments the accuracy of the method. Numerous methods for synchronization and/or for determining time- and/or clock-cycle-differences and/or drift are known from the prior art.

Time differences and/or drift can also be determined indirectly by triangular relationships. For example, if the time difference and/or drift between X and Y, and between Y and Z, is known, from this the time difference and/or drift between X and Z can be calculated.

Preferably, the second object and/or the at least one third object determines its time and its time drift relative to the first object.

In a preferred embodiment, the method contains the synchronization, particularly wirelessly, of the times and/or clock-cycles in the first and third object. Preferably, a time- and/or clock-cycle-synchronization and/or -correction is carried out between the first and third object before, after and/or while the method is carried out. This augments the accuracy of the method, since the drift is also ascertained thereby and can be considered. Preferably, a drift of the clocks of the first and/or third object, or a difference in the drift of the clocks of the first and third object, is also determined and considered in the distance determination. This further augments the accuracy of the method.

Especially advantageously, the distance between the at least one second object and the first object is determined, without determining the distance between the first and third object in order to do so, and/or the distance between the first object and the at least one second object is determined independently of the distance between the first and third object. This augments the speed and accuracy of the method.

Especially preferably, the method is carried out with a plurality, particularly with a common plurality greater than one, particularly greater than two, particularly greater than four, of second objects, and common first and particularly common second and third object(s), wherein it is preferable for the calculated distances, particularly between the first and each of the plurality of second objects, to be used to carry out a mapping and/or position determination of the first object. By using multiple objects, particularly second and/or third objects that are arranged spatially distanced from one another, the reliability and accuracy can be augmented, and a position-finding is enabled, such as by means of triangulation.

Preferably, the method is executed multiple times, wherein the at least one second and at least one third object can also switch their roles, however the first object is common to all execution of the method and/or is constant. For example, of a plurality of objects, one changing part of the plurality can always be second objects, and another part can be third objects.

Preferably, the plurality of second objects has a fixed location and/or orientation to one another, which is, particularly, known and/or determined by radio location. This allows for simple triangulation for locating the first object, for example.

Advantageously, the method is executed by means of a system, and/or access system, according to the invention. Advantageously, the system or access system is configured for implementing one or more advantageous embodiment(s) of the method, and has an appropriately configured control for this purpose.

Advantageously, at no time does the bandwidth of the signals exceed 50 MHz, particularly 25 MHz. Consequently energy can be saved, interference with other processes can be prevented, and simple components can be used compared to broadband methods.

Advantageously, the signals are transmitted over multiple antenna paths, particularly with multiple antennas, particularly successively, transmitted at the transmitting object, and/or received at the receiving object, with multiple antennas.

Preferably the first and/or third object transmits the signals on multiple frequencies successively and/or consecutively, in particular directly consecutively, and/or the first and third object transmit consecutively in alternating fashion.

The calculation of the distance is done as follows, for example:

In dependence upon the carrier frequency, the phases/amplitudes of the first object measured at the second object are corrected by the expected/calculated error from the known time shift between the objects, and by the time drift of the two system clocks of the objects. These values can then be evaluated, for example, using an FFT. Vectors can also be constructed (e.g., for different antenna paths), from which an autocorrelation matrix (ACM) is created, and high-resolution methods, such as MUSIC or CAPON, can be used to search for the distances in this ACM.

Following the premise of phase-coherent frequency switching at the first and third object, it is possible to proceed in the following manner, otherwise the calculation becomes somewhat more complicated:

In particular, after ascertaining the exact time differences and time drift between the third and first object, and between the second and third object, the sufficiently exact time difference between the first and second object can be calculated at every time for a limited timeframe (e.g., 100 ms).

At the second object, the IQ values or phases/amplitudes are determined on at least 2 (up to n) frequencies (F0 to Fn) of a signal of the first object.

At the second object, particularly the IQ values or phases/amplitudes are determined on at least 2 (up to n) frequencies (F0 to Fn) of a signal of the at least one third object.

For this purpose, for example, if the switching time points between the frequencies F0 to Fn', and/or F0 to Fn, and/or their relationship in time, is known, one object, for example, the first or second object, can determine the switching times between the frequencies in F0' to Fn' on the basis of the time synchronization with, at least, the third object. If the times at which the switching was received are measured, times-of-flight, particularly pulse times-of-flight (ToF), can be directly determined therefrom.

However, the switching with known phase jump or without phase jump also allows the frequency shift to be directly measured via the frequency change. This applies to both signals of the first object, as well as those of the at least one third object, which are received at the second object, but also to some extent at the first or third object. By this alone, it is already possible for the second object to determine both the distance to the first object, as well as to the at least one third object, for example by means of Distance=dPhase shift (f1,f2)/2Pi/dFrequency (f1,f2)*c
    where c is the speed of light, and
dPhase shift (f1,f2) is equal to the measured change in phase shift at the receiver by the frequency change from f1 to f2, corrected by the phase jump at the transmitter when switching from f1 to f2, and
dFrequency (f1,f2) equal to the difference between frequencies f1 and f2

In particular, the change in phase shift is caused by the change of frequency at approximately the same distance. The phase shift is thus caused by the distance. The change in the phase shift caused by the frequency change or is caused in that, particularly when both measurements are at approximately equal distance, a different number of wave packets fit within the distance, and consequently the phase shift, which is caused by the distance, ends up being different between the frequencies. This change in the phase shift as a result of the frequency is the phase change caused by the frequency change. In this context, problems result during measuring since in each case, the phase measurement is dependent on a reference, and a, frequently undefined, phase jump can result when switching over to transmit the various frequencies. Switching over for transmitting, and particularly also for receiving, is thus preferably done phase-coherently, i.e., with a phase jump of zero. But determining or knowing the phase jump is also sufficient. Then one can determine the phase change by the frequency change, through the measured phase change corrected by the phase jump upon switchover of the transmitter, and the phase jump upon switchover at the receiver for measuring the measured phase change.

If the switching time-points of the first object and of the at least one third object have a time relationship that can be derived, ascertained, communicated, and/or predetermined, which is preferred, further information for improving the measurement can be obtained thereby. If, for example, the switching time-points between frequencies of the at least one third object occurred are known, and/or made known, to the at least second object, which is preferred, from the relation of the switching time-points it is possible to determine the switching time-points of the frequencies of the first object, at least in dependence upon the distance between the first object and at least one third object, which results in further improvement.

If the switching time-points between frequencies of the first object are known, and/or made known, to the at least [one] second object, which is preferred, the time-of-flight (pulse time-of-flight, ToF), and thus the distance, of the signal from the first to the second object can be directly determined. But even based solely on the frequency switch of the emission of the signals of the first object without or with a known phase jump, the distance can be determined directly via the second object, for example, as explained above, by means of the following: Distance=dPhase shift (f1,f2)/2Pi/dFrequency (f1,f2)*c The measured phase shifts (Ph) can be adjusted to the time differences and/or frequency differences (incl. Drift) in order to augment the accuracy (except for, for example, F0). It is sufficient for the drift to be considered approximately. Determining this is known from the prior art and can be done for the distance determination, for example, by determining the time differences at different times, for example before and after the signal exchange.

The point in time at which the clocks are synchronized can also be different, i.e., for example, does not coincide with the transmission time-point. The calculation can then be adjusted accordingly.

For example, to resolve multipathing, the individual phases, with the associated measured amplitudes as complex values, for example, can be input into a Fourier transformation, or a spectral estimate can be performed in matrices using super-resolution methods, such as MUSIC or CAPON.

BRIEF DESCRIPTION OF THE DRAWINGS

FIG. 1 shows schematically a vehicle with a first object implemented as a key fob, along with multiple second objects and a third object therein

DETAILED DESCRIPTION

FIG. 1 shows, purely by way of example and not in a limiting manner, a vehicle with multiple second objects (2) and a third object (3) arranged therein, as well as a first object (1) implemented as a key fob. In carrying out the method, the respective distances between the first object and each second object are determined. If the time synchronization between the third and second object takes place in a cabled manner, for example, the second objects can be implemented without a transmitter and thus can be passive or non-locatable.

The invention claimed is:

1. A method for determining a distance between a first object and a second object, wherein the second object and at least one third object are clock-cycle- or time-synchronized, wherein the second object does not transmit any signals except for time synchronization, or the second object does not transmit any signals used for distance determination or is passive other than the time synchronization, wherein the first object transmits at least one first-object signal and at least one third object transmits at least one third-object signal and the second object receives the at least one first-object signal of the first object and the at least one third-object signal of the at least one third object and a distance between the first object and the second object is determined on basis of the received at least one first-object signal of the first object and the at least one third-object signal of the at least one third object, and wherein the at least one third object switches phase-coherently between at least two third-object frequencies of the least one third-object signal, or switches such that a phase difference occurring upon changing between the at least two third-object frequencies of the at least one third-object signal is known by or is made known to the first object or to the second object, or to both, or wherein the first object switches phase-coherently between at least two of the first-object frequencies of the at least one first-object signal, or switches such that a phase difference occurring upon switching between the at least two of the first-object frequencies of the at least one first-object signal is known or is made known to the second object or to the at least one third object, or to both.

2. The method according to claim 1, wherein the first object transmits in each case, the at least one first-object signal before or after the at least one third-object signal.

3. The method according to claim 1, wherein, for each of the at least one first-object signal and the at least one third-object signal received at the second object a value proportional to an amplitude and a phase value are determined.

4. The method according to claim 1, wherein the second object and the at least one third object are arranged in a fixed relative spatial situation or orientation.

5. The method according to claim 1, wherein the first object is an authorization means and wherein the second object and the at least one third object are part of an arrangement to which access is sought or granted by means of the authorization means.

6. The method according to claim 1, wherein the at least one third object receives the at least one first-object signal and supplies information about the received at least one first-object signal, and this information is used in calculating the distance, or wherein the first object receives the at least one third-object signal and supplies information about the received at least one third-object signal, and this information is used in calculating the distance.

7. The method according to claim 1, wherein at least one of the first object, the second object, and the at least one third object determines an information for correcting phase values of measured respective first-object or third-object signals from the received at least one first-object signal or the at least one third-object signal, wherein the information for correcting phase values measured in respective to the first-object or third-object signals is used during calculating the distance.

8. The method according to claim 1, wherein time-points or a time schedule of emissions of the at least one third object, or the at least one first-object signal, or of both, or features of the time-points or the time schedule of emissions of the at least one third object or the at least one first-object signal, or of both, are/is predetermined, or are/is known to the second object, or are/is used during calculating the distance.

9. The method according to claim 1, wherein the method contains the synchronization of the times or clock-cycles in the second object and the at least one third object.

10. The method according to claim 1, wherein the distance between the first object and the second object is determined, without determining the distance between the first object and the at least one third object in order to do so, or wherein the distance between the first object and the second object is determined independently of the distance between the first object and the at least one third object.

11. The method according to claim 1, carried out with a plurality of second objects and with exactly one common first object, and at least one common third object, and wherein distances calculated between the one common first object and the plurality of second objects are used for carrying out a mapping or position determination of the first object.

12. The method according to claim 11, wherein the plurality of second objects and the at least one common third object have a fixed location or orientation to one another.

13. A system having at least one first object, at least one second object, and at least one third object, wherein the at least one first object is configured for emitting at least one first-object signal with different first-object frequencies, wherein the at least one third object is configured for emitting at least one third-object signal, and wherein all of the at least one first object, the at least one second object and the at least one third object are configured for receiving signals, wherein the at least one second object is configured to receive the at least one third-object signal and at least one first-object signal, wherein the at least one second object and the at least one third object are configured for carrying out a clock-cycle- or time-synchronization, and wherein the system has at least one controller that is configured for determining at least one distance between the at least one second object and the at least one first object based on the at least one third-object signal and the at least one first-object signal received by the at least one second object, wherein at least one of the at least one third object and the at least one first object is configured for switching phase-coherently between at least two third-object frequencies or at least two of the first-object frequencies, respectively, or for switching such that a phase difference occurring upon switching between respectively the at least two third-object frequencies or the at least two of the first-object frequencies is known or is made known to the at least one first object or to the at least one third object respectively, or to the at least one second object, or to all three.

14. An access system having at least one access restriction apparatus, wherein the access restriction apparatus is configured for granting or denying access by means of an access restriction means, further comprising a first object, a second object, and at least one third object, wherein the first object is configured for emitting at least one first-object signal with different first-object frequencies, wherein the at least one third object is configured for emitting at least one third-object signal and wherein all of the first object, the second object, and the at least one third object are configured for receiving signals, wherein the second object is configured to receive the at least one third-object signal and the at least one first-object signal, wherein the second object and the at least one third object are configured for carrying out a clock-cycle- or time-synchronization, and wherein at least one of the at least one third object and the first object is configured for switching between at least two third-object frequencies or at least two of the first-object frequencies, respectively, and wherein the system has at least one controller that is configured for determining at least one distance between the second object and the first object based on the at least one third-object signal and the at least one first-object signal received by the second object, wherein the access restriction apparatus is configured for not denying the access or granting the access if the at least one distance between the second object and the first object determined does not exceed a predetermined distance or lies within a predetermined distance range or if a position of the first object determined based on the distance determined lies within a first predetermined range or outside of a second predetermined range, or for denying the access or not granting the access if the at least one distance between the second object and the first object determined exceeds the predetermined distance or lies outside the predetermined distance range, or if the position of the first object determined based on the distance determined lies outside of the first predetermined range or inside the second predetermined range, wherein the at least one of the at least one third object and the first object is configured for switching phase-coherently between the at least two third-object frequencies or the at least two of the first-object frequencies, respectively, or for switching such that a phase difference occurring upon switching between respectively the at least two third-object frequencies or the at least two of the first-object frequencies is known or is made known to the first object or to the at least one third object, respectively, or to the second object, or to all three.

15. The method according to claim 1, wherein the first object transmits a plurality of first-object signals with different first-object frequencies.

16. The method according to claim 1, wherein the at least one third object transmits a plurality of third-object signals.

17. The method according to claim 3, wherein from the values proportional to an amplitude and the phase values each are determined as complex numbers and the complex numbers determined are used for determining the distance between the first object and the second object by creating a vector from the complex numbers or an autocorrelation matrix per received first-object signal and the at least one third-object signal.

\* \* \* \* \*